United States Patent [19]

Huber et al.

[11] Patent Number: 4,562,225

[45] Date of Patent: Dec. 31, 1985

[54] THERMOSETTING ADHESIVE AND SEALING COMPOUNDS

[75] Inventors: Hans Huber, Troisdorf-Spich; Norbert Vollkommer, Troisdorf-Kriegsdorf, both of Fed. Rep. of Germany

[73] Assignee: Dynamit Nobel AG, Troisdorf, Fed. Rep. of Germany

[21] Appl. No.: 693,787

[22] Filed: Jan. 23, 1985

[30] Foreign Application Priority Data

Jan. 24, 1984 [DE] Fed. Rep. of Germany ....... 3402280

[51] Int. Cl.$^4$ .................... C08L 77/00; C08L 79/04
[52] U.S. Cl. ................................. 524/602; 524/275; 528/289; 528/296
[58] Field of Search ................ 524/275, 602; 528/289, 528/296

[56] References Cited

U.S. PATENT DOCUMENTS

| | | | |
|---|---|---|---|
| 3,966,836 | 6/1976 | de Cleur et al. .................. | 525/438 |
| 4,314,042 | 2/1982 | Goto et al. ........................ | 525/59 |
| 4,331,800 | 5/1982 | Inata et al. ....................... | 528/289 |
| 4,504,620 | 3/1985 | Cluff et al. ...................... | 524/602 |

FOREIGN PATENT DOCUMENTS 2012809  3/1970  Fed. Rep. of Germany.
2083392  3/1971  France.

*Primary Examiner*—Lucille M. Phynes
*Attorney, Agent, or Firm*—Felfe & Lynch

[57] ABSTRACT

Thermosetting adhesive and sealing compositions are described, consisting of:

(a) 70 to 95 wt.-% of polyesters with a glass transition temperature below 20° C., mixed in some cases with a polycarboxylic acid anhydride, (b) 5 to 30 wt.-% of polyoxazolines which contain at least 2 oxazoline groups per molecule, the polyoxazolines being suspended in the polyesters, (c) 0 to 4 wt.-% of paraffin and (d) optionally additional 1 to 50 weight-percent of the total amount of the components, of reactive or nonreactive diluents and/or additives and/or fillers.

6 Claims, No Drawings

THERMOSETTING ADHESIVE AND SEALING COMPOUNDS

BACKGROUND OF THE INVENTION

The invention relates to thermosetting adhesive and sealing substances of the composition of:

(a) 70 to 95 wt.-%, preferably 80 to 92 wt.-%, of polyesters having a glass transition temperature below 20° C., mixed, if desired, with a polycarboxylic acid anhydride, preferably trimellitic acid anhydride, (b) 5 to 30 wt.-%, preferably 6 to 18 wt.-%, of polyoxazolines containing at least 2 oxazoline groups per molecule, the polyoxazolines being suspended in the polyesters, (c) 0 to 4 wt.-%, preferably 1.5 to 3 wt.-%, of paraffin, and (d) optionally additional 1 to 50%, preferably 1 to 20%, of the total weight of the components, or reactive or nonreactive diluents and/or additives and/or fillers.

It is known to react carboxyl groups with oxazoline groups with the opening of the oxazaline ring and addition, to form an ester amide group:

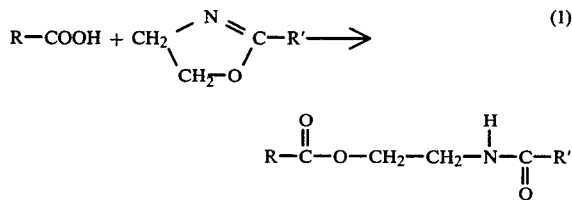

(1)

In this equation, R and R' are any desired organic moieties, such as aliphatic or aromatic moieties.

Above 120° C., reaction 1 takes place at a rate that is sufficient for preparation purposes. For technical purposes, it has been utilized for lengthening the chain of polyesters (European publication OS No. 0 020 944, Japanese publications OS No. 56-18618 (1981), OS No. 55-145733 (1980)), for the preparation of block copolyesters (Japanese publication OS No. 57-36119 (1982)), for the stabilization of polyesters by reduction of the acid number, corresponding to an end-group termination (Japanese publication OS No. 55-161824 (1980)), and for the introduction of reactive flame retardants into molding compositions containing carboxyl groups (Japanese publication OS No. 57,47327 (1982)), but mainly in the thermal crosslinking of powder varnish systems for electrostatic coating (German publications OS No. 23 28 012 and OS No. 30 28 477, and Japanese publication OS No. 56-36551 (1981)).

In the latter case, a preferably branched polyester having more than 2 carboxyl groups per molecule is physically mixed with a bifunctional oxazoline by coextrusion in the molten state (followed by rapid cooling to prevent premature crosslinking), and, after grinding to a powder and electrostatic application to metal surfaces, hardened by crosslinking. Only those powdered varnish systems have been described whose polyester component decidedly changes to the plastic or liquid state above room temperature. Such systems have a long shelf life at room temperature without the occurrence of crosslinking due to reaction of the carboxyl groups with the oxazoline groups. The reason for the suppression of the crosslinking reaction, and hence for the shelf life required even of powdered varnishes, is the high glass transition temperature of the systems, which is definitely above room temperature. This can be seen by comparing them with epoxy-hardened powdered varnish systems in which, instead of the polyfunctional oxazolines, polyfunctional epoxides are made to react with the polyesters containing carboxyl groups.

The polyester components of the above-named powdered varnish systems are built up on the basis of terephthalic and isophthalic acid as well as trimellitic acid as the polycarboxylic acids, and 2,2-dimethyl-1,3-propanediol (neopentyl glycol, NPG), ethylene glycol, and 2-ethyl-2-hydroxymethyl-1,3-propanediol (trimethylol propane, TMP) as the polyols, and they have glass transition temperatures ranging from 55° to 65° C. This makes it possible, since molecular movement is frozen, for carboxyl and epoxide groups to coexist at room temperature without any perceptible reaction. If, however, compounds having several epoxy groups are incorporated into polyesters which are semisolid or liquid at room temperature and contain carboxyl groups, and which have a glass transition temperature below room temperature, a reaction will take place between the carboxyl groups and the epoxy groups and the system will tend to set prematurely within a few days to a few weeks, depending on the functionality of the reacting groups, and the presence, kind and quantity of a catalyst.

It was the object of the invention to develop thermosetting binder systems usable for adhesive and sealing compositions, which were to satisfy the following requirements:

1. Mixtures were sought which are poor in or are entirely free of volatile solvents.

2. The consistency of the products should be pasty or highly viscous so as to permit working at room temperature or moderately elevated temperature (up to 100° C.).

3. Another requirement for the adhesive and sealing system is that it should be a single-component system, i.e., the reacting components must remain in the reactive state, in the form of a ready-to-use mixture, for months at room temperature, without any progressive crosslinking reaction that might lead to any substantial reduction of the working and service characteristics of the system.

On the basis of the great variety of the polyesters, i.e., the multiplicity of the components that can be used in preparing them, there is also a broad range of characteristics of the set products. Accordingly, a very wide range of applications was desired, such as, for example, structural adhesives for metalworking, adhesive and sealing compositions such as those used in automotive manufacture, but also low-tack products suitable for use as pressuresensitive adhesives.

The Invention

This object is achieved by the present invention. The thermosetting compositions which satisfy the above requirements consist of the unreacted mixture of polyesters and polyoxazolines which are hardened by crosslinking under polyaddition conditions. The polyesters are those which have a glass transition temperature below 20° C. The polyoxazolines have at least two oxazoline groups per molecule.

It was to be expected that single-component systems consisting of mixtures of polyfunctional oxazolines and semi solid or liquid carboxyl-group-containing polyesters having a glass transition temperature below room temperature would not have the necessary stability in storage at room temperature, since the reactivity of the epoxy group (with the carboxyl group) is comparable to that of the oxazoline group. Furthermore, the only carboxyl group/oxazoline group systems storable at room temperature that have been described heretofore have a glass transition temperature above room temperature. The reason for this lies certainly in the fear that these systems would react prematurely, so that they would be expected to crosslink and become unusable.

Surprisingly, however, pasty mixtures of polyfunctional oxazolines and polyesters containing carboxyl groups, which are liquid or semisolid at room temperature, have proven to be stable in storage in sealed containers for several months in the sense that none of the feared premature crosslinking takes place.

When stored in open containers, the stability of the mixtures of polyfunctional oxazolines and carboxyl-groupcontaining polyesters is reduced. This reduction of stability, however, does not involve premature crosslinking, but is due to the sensitivity of the system to atmospheric humidity. In the hardening process that follows the bonding or sealing operation, the product then fails to yield a thoroughly set, tough, resilient adhesive or sealing composition, producing only a soft, tacky mass of no mechanical strength.

With the invention, by the additional incorporation of paraffin in the amount of up to 4%, preferably 1.5 to 3%, of the total weight of the mixture, an excellent hardening action and good mechanical properties in the hardened state have successfully been imparted to an adhesive mixture exposed to the atmosphere even for a relatively long period of time.

The polyester components of the mixtures of the invention are polycondensates on the basis of aromatic and aliphatic dicarboxylic acids, such as terephthalic and isophthalic acid, glutaric acid, succinic acid and adipic acid, azelaic acid, sebacic acid, decanedicarboxylic acid and dimeric fatty acids (prepared by the Diels-Alder reaction from linolic acid, hydrogenated or partially hydrogenated if desired; they can also contain relatively large amounts of trimeric fatty acid), or the polyester-forming derivatives of these acids, and on the basis of aliphatic or cycloaliphatic diols such as ethylene glycol, diethylene glycol, neopentyl glycol, butanediol, hexanediol, cyclohexane dimethanol, and, if desired, trivalent alcohols such as trimethylolpropane. Preferred polyesters are polycondensates on the basis of succinic acid, glutaric acid, adipic acid, and dimeric fatty acid or mixtures thereof as dicarboxylic acid components, and ethylene glycol, diethylene glycol and neopentyl glycol as diol components, with glass transition temperatures below 20° C., preferably below 10° C. The polyesters prepared preferably by the melt-polycondensation method, which are liquid or semisolid at room temperature, or can be melted by heating up to 90° C., possess immediately after synthesis mainly hydroxyl terminal groups (hydroxyl number ranging from 10 to 60, preferably 20 to 40 mg KOH/g, and acid numbers ranging from 0 to 9, preferably 0 to 5 mg KOH/g), and, after so-called "acid-capping", preferably with trimellitic acid anhydride, having acid numbers ranging from 20 to 120, preferably 40 to 80, mg KOH/g. The acid-capping process consists in reacting the polyester components, which have been obtained by polycondensation, with an acid anhydride. The hydroxyl groups of the polyester react with the acid anhydride group to form carboxyl groups. The reaction takes place at elevated temperature. In the case of the present invention, it can be performed before or during the hardening. In addition to the above-named trimellitic acid anhydride, other saturated or unsaturated, aliphatic, cycloaliphatic or aromatic polycarboxylic acid anhydrides can be used for the process of acid-capping, such as, for example, succinic acid, maleic acid, phthalic acid, hexahydrophthalic acid or tetrahydrophthalic acid anhydrides.

The minimum necessary amount of trimellitic acid anhydride (TMSA) for the acid-capping of the terminal hydroxyl groups of the polyesters is adapted stoichiometrically, in accordance with the invention, to the amount of hydroxyl terminal groups indicated by the hydroxyl number of the polyester, although, for the benefit of the general characteristics of the adhesive and sealing compositions and their behavior in hardening, it has proven advantageous to use an excess of TMSA, above the stoichiometric amount with respect to the hydroxyl terminal groups, ranging from 1 to 20, preferably 5 to 10, mol-%, for the purpose of achieving a somewhat denser crosslinking of the compositions, and for the purpose of compensating for a content, amounting to a few percent, of free trimellitic acid that may be present in the TMSA, and which, under the conditions of the reaction, will react only very incompletely with the hydroxyl groups. The acid-capping of the products occurring in the synthesis mainly as polyesters containing hydroxyl terminal groups can be performed in the reaction vessel, in the conventional manner, by the addition of TMSA immediately after the polycondensation, in the temperature range from 100° to 200° C., preferably 120° to 180° C. It has also proven to be an alternative with certain advantages to refrain from performing the reaction of the hydroxyl groups with the anhydride groups, and to only physically mix the TMSA, together with the other reaction components and additives, into the polyester containing the hydroxyl groups. Under the hardening conditions, the addition of the TMSA onto the hydroxyl terminal groups of the polyester with the formation of carboxyl groups on the latter takes place before or during the above-described crosslinking reaction (of the carboxyl groups with the oxazoline groups).

The properties of the cured end products obtained by the two methods of procedure are comparable. For the crosslinking of the polyesters containing the carboxyl groups, polyfunctional, preferably bifunctional, oxazolines are used, for example, 1,4-bis-($\Delta^2$-oxazolinyl-2-)benzene (p-phenylene-bis-oxazoline); 1,3-bis-($\Delta^2$-oxazolinyl-2)-benzene (m-phenylene-bis-oxazoline);1,2,4-tris-($\Delta^2$-oxazolinyl-2)benzene; bis-($\Delta^2$-oxazolinyl-2)-butane (tetramethylene-bisoxazoline), or mixtures of these polyfunctional oxazolines. p-Phenylene-bis-oxazoline is greatly preferred.

The amount of bisoxazoline to be used can be in the range of the given equivalence based on the stoichiometry of Reaction 1: one carboxyl group reacts with one oxazoline group.

Regarding the setting speed, degree of curing, and the sensitivity of the system to moisture and additives, and for the benefit of the final properties of the adhesive and sealing compositions, however, it has proven advantageous to use a stoichiometric excess of oxazoline groups ranging from 1 to 30 mole-%, preferably 15 to 25 mole-%, with respect to the carboxyl groups.

In addition to the reactants, namely the polyfunctional oxazoline and the polyester containing carboxyl groups, and to the paraffin required for stabilization, additives and fillers can be added, such as talcum, carbon black for the preparation of electrically conductive adhesives and sealing compositions, and reactive and nonreactive diluents for the adjustment of viscosity. Suitable reactive diluents are liquid compounds having a polyol nature, such as polyethylene glycols or polypropylene glycols which, after the acid-capping, are included in the oxazoline crosslinking reaction, or liquid compounds of a dicarboxylic acid nature, such as dimeric fatty acids, which can participate directly in the crosslinking mechanism.

The addition of nonreactive diluents (nonreactive in the sense of the crosslinking reaction on which the system is based), such as liquid coumarone-indene resins or phthalate plasticizers for example, has also proven advantageous.

The preparation of adhesive and sealing pastes is performed in a known manner by incorporating the polyfunctional oxazoline, the paraffin and any additives that are to be used, into the acid-capped polyester, and homogenizing, preferably in kneading machines or rolling mixers.

The setting is performed at temperatures above 100° C., preferably in the temperature range from 120° to 180° C.

The setting time ranges from 10 minutes to one hour.

Overbaking for from several hours above 180° C. to two hours at 240° C. does not impair the quality of the glue joint or seal.

The adhesion of the adhesive and sealing compositions of the invention to metal surfaces, especially even to sheet steel that has not been degreased, is excellent.

For the use of the mixtures of the invention as pressuresensitive adhesives, polyesters having an especially low glass transition temperature ($-10°$ C. or less) are used to advantage. Furthermore, in the majority of cases, it will be desirable to have a lower crosslinking density than in the case of structural adhesives, for example. This can be achieved, for example, by not letting all of the hydroxyl groups present in the starting polyester react with TMSA, and/or by using a smaller amount of bisoxazoline.

The curing of the compositions is performed in this case immediately after coating the appropriate support material, by brief heating, it being especially advantageous to cure them by radiation with infrared radiators. In the preparation of these compositions, the addition of a paraffin is unnecessary, since the compositions used as pressuresensitive adhesives are not exposed to atmospheric influences during storage.

EXAMPLE 1

(a) Preparation of the polyester component.

243.4 g (2.35 mol) of adipic acid and 84.6 g (0.15 mol) of a dimeric fatty acid prepared by the Diels-Alder reaction from linolic acid and containing 10% of trimer by weight, and 85.25 g (1.375 mol) of ethylene glycol, 39 g (0.375 mol) of neopentyl glycol and 119.4 g (1.125 mol) of diethylene glycol, plus 0.54 g of tripheynlphosphite as antioxidant, are weighed into a glass flask equipped with a stirrer, a tube for feeding nitrogen, and a descending cooling system. The mixture is esterified for 1 h at 180° C., 1 h at 200° C., 1 h at 220° C. and 2 h at 240° C. while stirring and flooding slowly with nitrogen and removing the reaction water by distillation. After the addition of 0.27 g of 2-ethylhexanediol-1,3-titanate as catalyst, a vacuum is applied and the pressure is lowered over a period of 30 minutes to 1 millibar. The temperature is increased to 250° C., and a polycondensation is performed until the characteristics given below are reached.

A polyester that is a viscous liquid at room temperature is obtained, having a reduced specific viscosity of 0.5 dl/g according to DiN 53728; acid number=0.2 mg KOH/g, and hydroxyl number=18 mg KOH/g.

(b1) Preparation of the adhesive composition and sealing composition. 90 g of the polyester obtained in Example 1a is heated at 170° C. and 5.4 g of trimellitic acid anhydride is stirred in. After the TMSA has dissolved, 1.45 g of paraffin with a softening range of 56° to 58° C. is stirred in, the mixture is cooled to room temperature, and 6.3 g of p-phenylene bisoxazoline (p-PBO) in powder form is stirred in. A pasty adhesive is obtained.

(c1) Bonding Greasy steel plates (St 37) 1 mm thick are coated partially with the paste and overlapped, such that the area of adhesion amounts to 5 cm$^2$ (overlap width 20 mm, overlap length 25 mm) and the adhesive thickness in the glue joint is 0.8 mm.

Curing is peformed in a convection drying oven for 20 minutes at 150° C. Tensile shear strength in this example as in the following examples is measured in a tensile tester at a temperature of 23° C. with a filling rate of 50 mm/min:

2 h after setting: 220 N/cm$^2$
24 h after setting: 240 N/cm$^2$
(Cohesive rupture in each case).

After overbaking for 20 minutes at 180° C. and 10 minutes at 210° C., the shear strength was 265 N/cm$^2$ (cohesive rupture) (2 h after setting).

(b2) 100 g of polyester from Example 1a are acid-capped with 7.3 g of TMSA and, with the addition of 2.5 g of paraffin, was stirred with 8.6 g of p-PBO to form a paste.

(c2) If the same greasy type of sheet steel is bonded as described in (c1) with the paste obtained in Example 1 (b2), the following shear strengths are obtained:

2 hours after setting: 256 N/cm$^2$
24 hours after setting: 268 N/cm$^2$
(Cohesive rupture in each case).

After overbaking for 20 minutes at 180° C. and 10 minutes at 210° C/, a shear strength of 310 N/cm$^2$ was found (cohesive rupture) 2 hours after setting.

(c3) After 6 months of storage at room temperature, in a sealed vessel filled to about half its capacity with air, the paste obtained under (b2) is not visibly altered. After bonding as described in (c2), the following shear strengths were found:

2 h after setting: 260 N/cm$^2$
24 h after setting: 260 N/cm$^2$
(Cohesive rupture in each case).

After overbaking for 20 minutes at 180° C. and 10 minutes at 210° C., the tensile shear strength was found to be 300 N/cm$^2$ (cohesive rupture).

EXAMPLE 2

(a) A polyester of low molecular weight is prepared using the same formula and procedure as in Example 1. It has the following characteristics: $\eta sp/c = 0.34$ dl/g; acid number: 1.5 mg KOH/g; hydroxyl number=26 mg KOH/g.

(b1) 100 g of the polyester of Example (2a) is acid-capped with 9 g of TMSA and, after the addition of 1.7 g of paraffin and cooling to room temperature, 11.5 g of p-PBO is stirred in. An adhesive paste is obtained.

(c1) After bonding greasy sheet steel (St 37) as in

Example 1(c1), the following tensile shear strengths were reached:
2 h after setting: 490 N/cm²
24 h after setting: 510 N/cm²
3 days after setting: 620 N/cm²
After overbaking for 20 minutes at 180° C. and 10 minutes at 210° C.: 610 N/cm².
(Cohesive rupture in each case.)

(c2) The adhesive paste is stored both for 3 months at 40° C. and for 6 months at room temperature, as in Example 1 (c3). In none of the samples could any external change be seen in the flow characteristics indicating premature crosslinking. The bonding of greasy sheet steel under the same conditions as under (c1) results in the following shear strengths.

Adhesive paste stored for 3 months at 40° C., then set for 20 minutes at 150° C. in the convection drying oven:
2 h after setting: 450 N/cm²
24 h after setting: 430 N/cm².
After overbaking for 20 minutes at 180° C. and 10 minutes at 210° C.: 630 N/cm² (cohesive rupture in each case).

Adhesive paste stored for 6 months at room temperature, then set for 20 minutes at 150° C. in the convection drying oven:
2 h after setting: 520 N/cm²
24 h after setting: 560 N/cm².
After overbaking for 20 minutes at 180° C. and 10 minutes at 210° C.: 580 N/cm². (Cohesive rupture in each case.)

(d1) An amount of microtalcum corresponding to 15% of the weight of the total amount of components was mixed into the adhesive paste of Example 2 (b1), and bonding was performed as above. A tensile shear strength of 380 N/cm² was measured 2 hours after setting for 20 minutes at 150° C.

(e1) For use as a sealing compound, the talcum containing paste of Example 2 (d1) is applied in the form of a bead to the edge of the hemming flange of a greasy sheet steel (St 37), and set as follows:
20 min. at 150° C., 20 min. at 180° C. and 10 min. at 210° C. An elastic, nonporous sealant bead of excellent adherence is obtained.

EXAMPLE 3

(a) By the esterification and condensation in a polycondensation apparatus of 6392 g (approx. 47 mol) of a dicarboxylic acid mixture, composed of 28–33 wt.-% of succinic acid, 40–45 wt.-% of glutaric acid and 24–28 wt.-% of adipic acid, 1692 g (3 moles) of a dimeric fatty acid prepared from linolic acid by the Diels-Alder reaction and containing about 5 wt.-% of trimer and 2170 g (35 moles) of ethylene glycol plus 2547 g (24 mol) of diethylene glycol, a polyester is prepared which is liquid at room temperature and has the following characteristics: $\eta sp/c=0.45$ dl/g; acid number=0.6 mg KOH/g and hydroxyl number=22.5 mg KOH/g. After the addition and stirring-in of 200 g of paraffin, the essentially hydroxyl-group-containing polyester, was discharged from the reactor, (b1) On a roller mixer, with a roll temperature of 50° to 60° C., 300 g of the polyester of Example (3a), 27.4 g of TMSA and 30.7 g of p-PBO were mixed to form a paste. Under these conditions the polyester still does not react with the trimellitic acid anhydride.

(c1) V2A steel plate 1.5 mm thick is partially coated with the adhesive paste from Example 3 (b1) and overlapped such that the glued area amounts to 5 cm² (overlap width 20 mm, overlap length 25 mm) and the thickness of the glue seam is 1 mm.

The adhesive is cured for 20 min. at 150° C. in a convection oven, and post-cured in some cases, under the conditions stated below. The determination of the shear strength was performed always 2 h after the curing or post-curing, as the case may be, in a tensile tester at a test temperature of 23° C. with a pulling rate of 50 mm/min.

|   | Cure | Tensile shear strength |
| --- | --- | --- |
| 1. | none | 300 N/cm² |
| 2. | 1 h at 180° C. | 600 N/cm² |
| 3. | 1 h at 200° C. | 610 N/cm² |
| 4. | 1 h at 220° C. | 420 N/cm² |
| 5. | ½ h at 240° C. | 330 N/cm² |

(Cohesive rupture in each case).

(c2) After 6 months of storage at room temperature as in Example 1 (c3) the paste is not visibly altered. Bonding and curing and post-curing are performed under conditions identical to those of (c1), and the following shear strengths were obtained:

|   | Cure | Shear strength |
| --- | --- | --- |
| 1. | none | 340 N/cm² |
| 2. | 1 h at 180° C. | 580 N/cm² |
| 3. | 1 h at 200° C. | 560 N/cm² |
| 4. | 1 h at 220° C. | 530 N/cm² |
| 5. | ½ h at 240° C. | 400 N/cm² |

(Cohesive rupture in each case.)

(d1) An amount of microtalcum corresponding to 10% of the total weight of the components was incorporated into the adhesive paste of Example 3 (b1) and V2A steel plates were bonded together as in (c1). A shear strength of 270 N/cm² was measured after setting in a convection oven for 20 minute at 150° C.

For use as a sealing composition, the talcum containing paste of Example 3(d1) is applied in the form of a bead on the edge of the hemming flange of a greasy steel plate and set as follows: 20 min. at 150° C., 20 min. at 180° C. and 10 min. at 210° C. An elastic, nonporous and excellently adherent sealant bead is obtained.

(b2) 300 g of the polyester of Example (3a) is heated to 170° C. and 25.6 g of TMSA is stirred in. After the TMSA has dissolved in the polyester, the mixture is cooled to room temperature and 28.6 g of m-phenylene bisoxazoline is incorporated. An adhesive in paste form is obtained.

(c3) Greasy steel plate (St 37) is bonded under the same conditions as in Example 3 (c1) using the adhesive paste prepared in Example 3 (b2). After curing in a convection oven for 20 minutes at 150° C., and after post-curing in some cases, the following shear strengths were reached:

|   | Cure | Shear strength |
| --- | --- | --- |
| 1. | none | 250 N/cm² |
| 2. | 1 h at 180° C. | 310 N/cm² |
| 3. | 1 h at 200° C. | 250 N/cm² |
| 4. | ½ h at 220° C. | 130 N/cm². |

EXAMPLE 4

(a) In a polycondensation apparatus, 5984 g (approx. 44 mol) of a dicarboxylic acid mixture as used in Example 3, 3384 g (6 mol) of a dimeric fatty acid prepared from linolic acid by the Diels-Alder reaction and containing about 20% by weight of trimer, and 2790 g (45 mol) of ethylene glycol plus 1486 g (14 mol) of diethylene glycol, a polyester that is liquid at room temperature is obtained by esterification and polycondensation, having the characteristics: $\eta sp/c = 0.28$ dl/g; acid number = 1.0 mg KOH/g, hydroxyl number = 30 mg KOH/g.

(b1) 300 g of the polyester of Example (4a) is acid-capped with 34 g of TMSA and, after stirring in 7.5 g of paraffin, the mixture is cooled to room temperature and 41.6 g of p-PBO is incorporated. An adhesive paste is obtained.

(c1) Greasy steel plate (St 37) is bonded with the adhesive paste as in Example 1 (c1).

After curing in the convection oven for 20 min. at 150° C., a shear strength of 340 N/cm$^2$ (23° C.; pulling rate 50 mm/min.) is measured 2 h after curing.

After post-curing for 20 min. at 180° C. and 10 min. at 210° C., the shear strength is 620 N/cm$^2$ (cohesive rupture in each case).

(c2) Alternatively, 3 g of the following diluents was added in each case to 20 g of the adhesive paste from Example 4 (b1), and the bonding, curing and post-curing were performed as in Example 4 (c1). The following shear strengths were obtained:

| Diluent | Shear Strength |
| --- | --- |
| Polyethylene glycol, mol. mass ≈400 | 380 N/cm$^2$ |
| Triproplylene glycol | 400 N/cm$^2$ |
| Dimeric fatty acid containing about 20 wt % of trimer (prepared from linolic acid by Diels-Alder reaction) | 412 N/cm$^2$ |
| Dimeric fatty acid containing about 10 wt. % of trimer (prepared from linolic acid by Diels-Alder reaction) | 400 N/cm$^2$ |
| Epoxy resin (short-chain aromatic epoxy resin based on bisphenol A with epoxy equivalent weight of 180 to 190 g/equivalent) | 720 N/cm$^2$ |
| Epoxy resin (low-viscosity, completely polyfunctional epoxy resin based on bisphenol A, with a viscosity per DIN 53015 of 900 to 1300 mPa · s at 25° C. and an epoxy equivalent weight of 160 to 178 g/equivalent) | 760 N/cm$^2$ |
| Coumarone-indene resin (viscosity at 20° C. 700 to 1200 mPa · s; max. acid number: 0.3 mg KOH/g; Barrett brightness: 0.5 to 1) | 526 N/cm$^2$ |
| Polybutadiene-maleic acid anhydride adduct containing 9% of maleic acid anhydride (mol. wt. 1800; acid number 85 mg KOH/g) | 390 N/cm$^2$ |
| Butadiene-acrylonitrile oligomer, carboxyl-group terminated (22% acrylonitrile, functionality: 2.3; viscosity at 27° C. 350,000 mPa · s) (cohesive rupture in all cases) | 540 N/cm$^2$ |

(c3) Alternatively, 2 g of microtalcum or 2 g of conductivity carbon black (furnace black) was incorporated in each case into 18 g of the adhesive paste from Example 4 (b1).

The bonding of greasy steel plate is performed as in Example 1 (c1). After setting for 20 minutes in the convection oven at 150° C. and curing for 20 minutes at 180° C. and 10 min. at 210° C., the shear strength of the talcum-containing adhesive is 540 N/cm$^2$, and that of the adhesive containing carbon black 460 N/cm$^2$.

(d1) For use as sealing compositions, the paste products of Example 4 (c2) and (c3), containing diluents and fillers, were applied to the edge of the hemming flange of a greasy steel plate (St 37) and set in the following manner: 20 min. at 150° C., 20 min. at 180° C. and 10 min at 210° C.

Elastic, nonporous sealant beads were obtained, having excellent adhesion.

EXAMPLE 5

(a) Preparation of the polyester containing carboxyl groups. A polyester is prepared by a procedure similar to that described in the foregoing examples, having the following composition:

| Raw materials: | | | |
| --- | --- | --- | --- |
| Phthalic acid | Terephthalic acid | Dicarboxylic acid mixture* | Ethylene glycol |
| Mol % 20 | 19 | 61 | 100 |
| Hydroxyl No.: | 31 | | |
| Acid No.: | 0.6 | | |
| Viscosity at 25° C.: | 2,330,000 mPa · s. | | |

*28–33 wt % succinic acid
40–45 wt % glutaric acid
24–26 wt % adipic acid 500 g of this polyester was heated at 130° C. and 53.2 g of molten trimellitic acid anhydride was added. The mixture was stirred for another 60 min. at 130° C., and bottled under nitrogen. The reaction product then had an acid number of 59 (theory: 56).

(b) Preparation and use of a reactive hot-melt pressure-sensitive adhesive 10 g of the polyester containing carboxyl groups was heated at 80° C. and 1.08 g of p-phenylene bisoxazoline (p-PBO) in powder form was stirred into the hot melt and carefully homogenized. This composition was applied in a thickness of 36 micrometers with a hand squeegee to a polyester film and then irradiated for 30 sec. with an infrared radiator (2 kW power input) at a distance of 30 cm. After 24 hours of standing, the films were affixed to a steel plate by means of a standardized rubber pressure roller of 4.5 lb deadweight and subjected to testing pursuant to the specifications of the Pressure Sensitive Tape Council PSTC-1 for peel strength and PSTC-7 for shear strength. PSTC-1 was modified by peeling at a rate of only 100 mm/min.

The shear strength was tested with a load of 4.52 kg (=10 lb). The bonded area measured 2.5×5.0 cm in each case. The figures given are averages of 2 measurements.

| Peeling strength: | Shear strength: |
| --- | --- |
| 16.75 N/2.5 cm (Loss of adhesion) | More than 72 hours |

It will be understood that the specification and examples are illustrative but not limitative of the present invention and that other embodiment within the spirit and scope of the invention will suggest themselves to those skilled in the art.

We claim:

1. A thermosetting adhesive and sealing composition comprising:
   (a) 70 to 95 wt.-%, preferably 80 to 92 wt.-%, of polyesters having a glass transition temperature below 20° C., mixed, if desired, with a polycarboxylic acid anhydride, preferably trimellitic acid anhydride;
   (b) 5 to 30 wt.-%, preferably 6 to 18 wt.-%, of polyoxazolines containing at least 2 oxazoline groups per molecule, the polyoxazolines being suspended in the polyesters;
   (c) 0 to 4 wt.-%, preferably 1.5 to 3 wt.-%, of paraffin; and
   (d) optionally additional 1 to 50%, preferably 1 to 20%, of the total weight of the components, of reactive or nonreactive diluents and/or additives and/or fillers.

2. The composition of claim 1, wherein component (a) consists of polyesters which contain a statistical average of at least two carboxyl groups per molecule and have acid numbers from 20 to 120, preferably 40 to 80, mg KOH/g and a glass transition temperature below 10° C.

3. The composition of claim 1, wherein component (a) consists of polyesters which contain terminal hydroxyl groups, have hydroxyl numbers of 10 to 60, preferably 20 to 40, mg KOH/g, and have a glass transition temperature below 10° C., and have at least an amount of polycarboxylic acid anhydride, preferably trimellitic acid anhydride, that is necessary for the acid-capping of the terminal hydroxyl groups.

4. The composition of claim 1, wherein the polyoxazoline is selected from the group consisting of p-phenylene bisoxazoline, m-phenylene bisoxazoline or tetramethylene bisoxazoline individually or in mixture.

5. The composition of claim 2, wherein the polyoxazoline is selected from the group consisting of p-phenylene bisoxazoline, m-phenylene bisoxazoline or tetramethylene bisoxazoline individually or in mixture.

6. The composition of claim 3, wherein the polyoxazoline is selected from the group consisting of p-phenylene bisoxazoline, m-phenylene bisoxazoline or tetramethylene bisoxazoline individually or in mixture.

* * * * *